(12) United States Patent
Oxley et al.

(10) Patent No.: US 7,178,853 B2
(45) Date of Patent: Feb. 20, 2007

(54) VEHICLE DOOR WITH PIVOT ARM

(75) Inventors: Peter Lance Oxley, Mount Albert (CA); Peter Adam Lejbjuk, Etobicoke (CA); Dragan Mrkovic, Newmarket (CA)

(73) Assignee: Intier Automotive Closures Inc., Newmarket (CA)

( * ) Notice: Subject to any disclaimer, the term of this patent is extended or adjusted under 35 U.S.C. 154(b) by 122 days.

(21) Appl. No.: 10/517,515

(22) PCT Filed: Jun. 6, 2003

(86) PCT No.: PCT/CA03/00890

§ 371 (c)(1),
(2), (4) Date: Dec. 10, 2004

(87) PCT Pub. No.: WO03/104005

PCT Pub. Date: Dec. 18, 2003

(65) Prior Publication Data

US 2006/0061135 A1    Mar. 23, 2006

Related U.S. Application Data

(60) Provisional application No. 60/387,451, filed on Jun. 11, 2002.

(51) Int. Cl.
*B60J 5/04* (2006.01)
(52) U.S. Cl. .................. 296/146.11; 296/155; 49/223
(58) Field of Classification Search ........... 296/146.11, 296/146.12, 155; 49/223, 260
See application file for complete search history.

(56) References Cited

U.S. PATENT DOCUMENTS

| 3,095,600 | A | * | 7/1963 | Bretzner ..................... 16/224 |
| 4,135,760 | A | | 1/1979 | Grossbach |
| 4,650,241 | A | * | 3/1987 | Motonami et al. ..... 296/203.03 |
| 6,030,024 | A | | 2/2000 | Schmidhuber et al. |
| 6,183,039 | B1 | | 2/2001 | Kohut et al. |
| 6,382,705 | B1 | | 5/2002 | Lang et al. |

FOREIGN PATENT DOCUMENTS

| DE | 1 174 183 | | 4/1960 |
| DE | 1 254 483 | | 10/1960 |
| DE | 4011787 A1 | * | 10/1991 |
| FR | 2 804 380 | | 2/2000 |
| GB | 890165 | | 7/1959 |
| GB | 1128645 | | 7/1967 |
| GB | 2049774 | | 12/1979 |

* cited by examiner

*Primary Examiner*—Joseph D. Pape
(74) *Attorney, Agent, or Firm*—Clark Hill PLC

(57) ABSTRACT

A vehicle door for fitting to a vehicle body includes a vehicle door frame, and a pivot arm coupled to the door frame. The door frame includes an upper portion, a lower portion, and a pair of opposite sides extending between the upper and lower portions. The pivot arm is coupled to the door frame adjacent one of the opposite sides, and includes a pair of opposite ends. One of the ends of the pivot arm includes a first hinge for pivotally coupling the pivot arm to the vehicle body about a first pivot axis. The other end includes a second hinge pivotally coupling the door frame to the pivot arm about a second pivot axis.

7 Claims, 4 Drawing Sheets

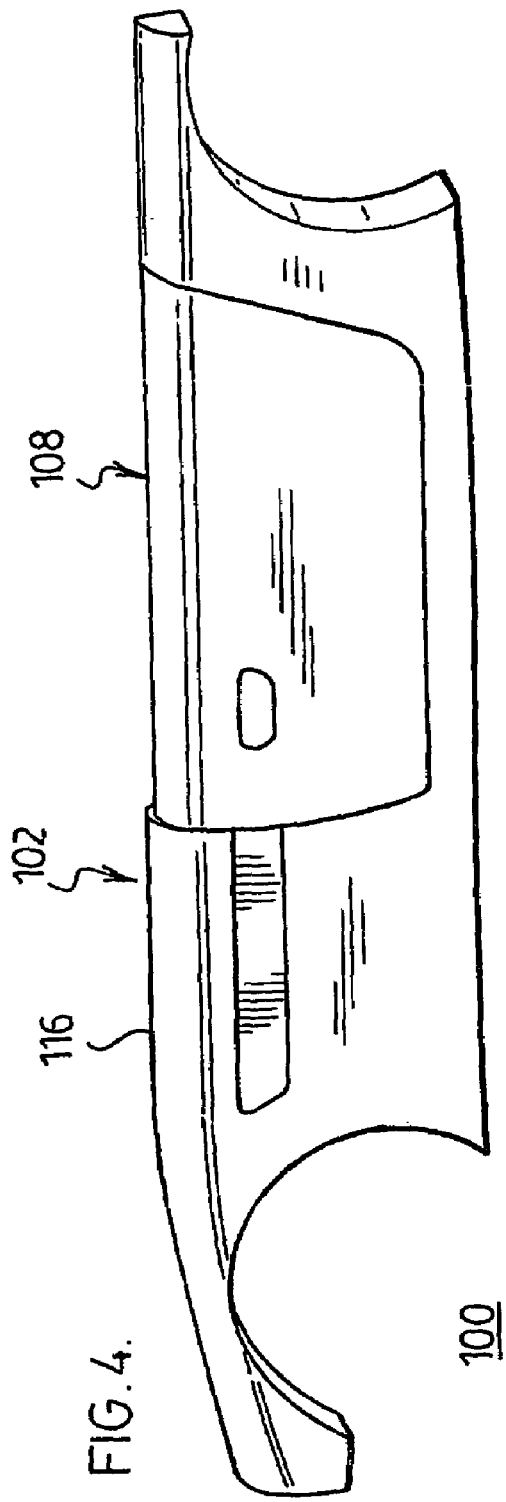
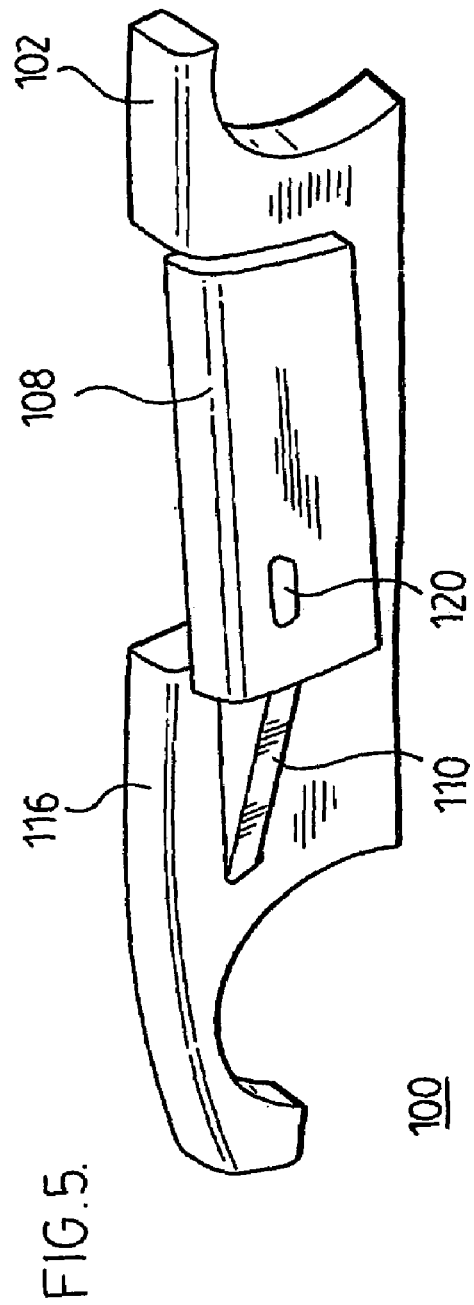

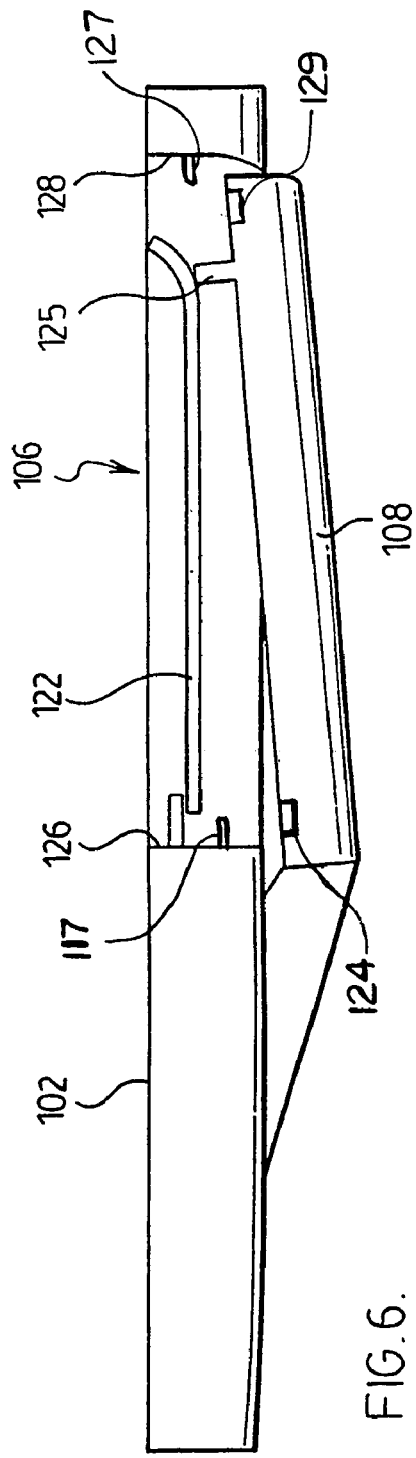
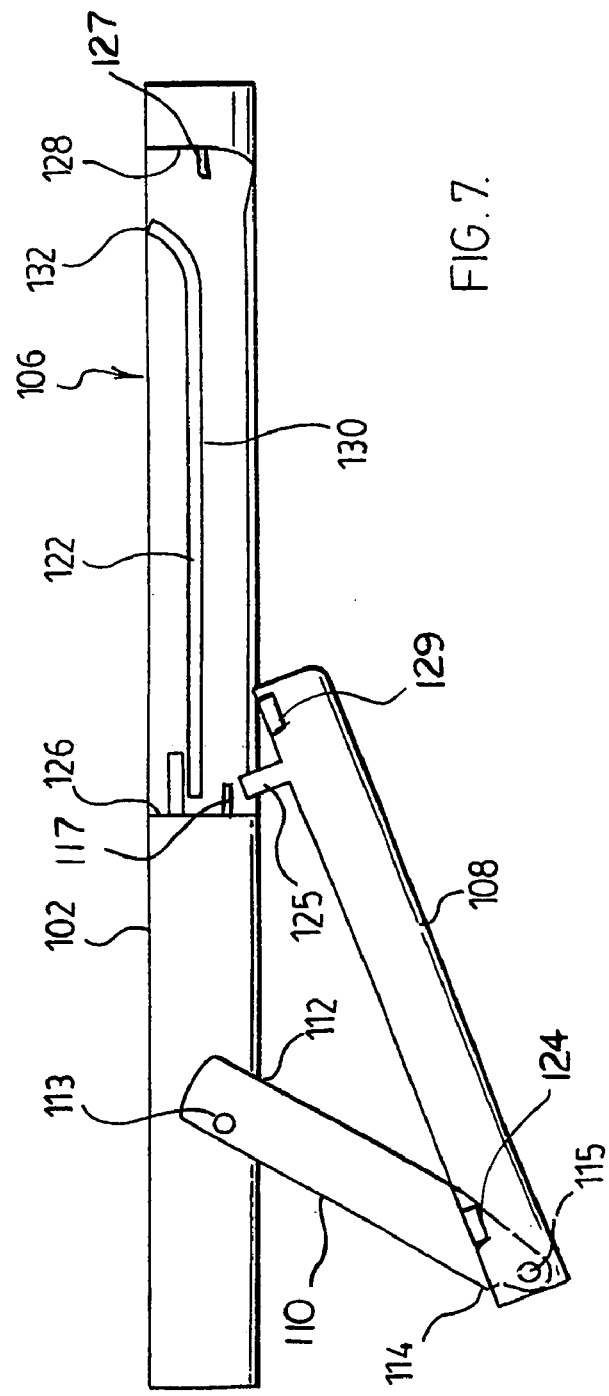

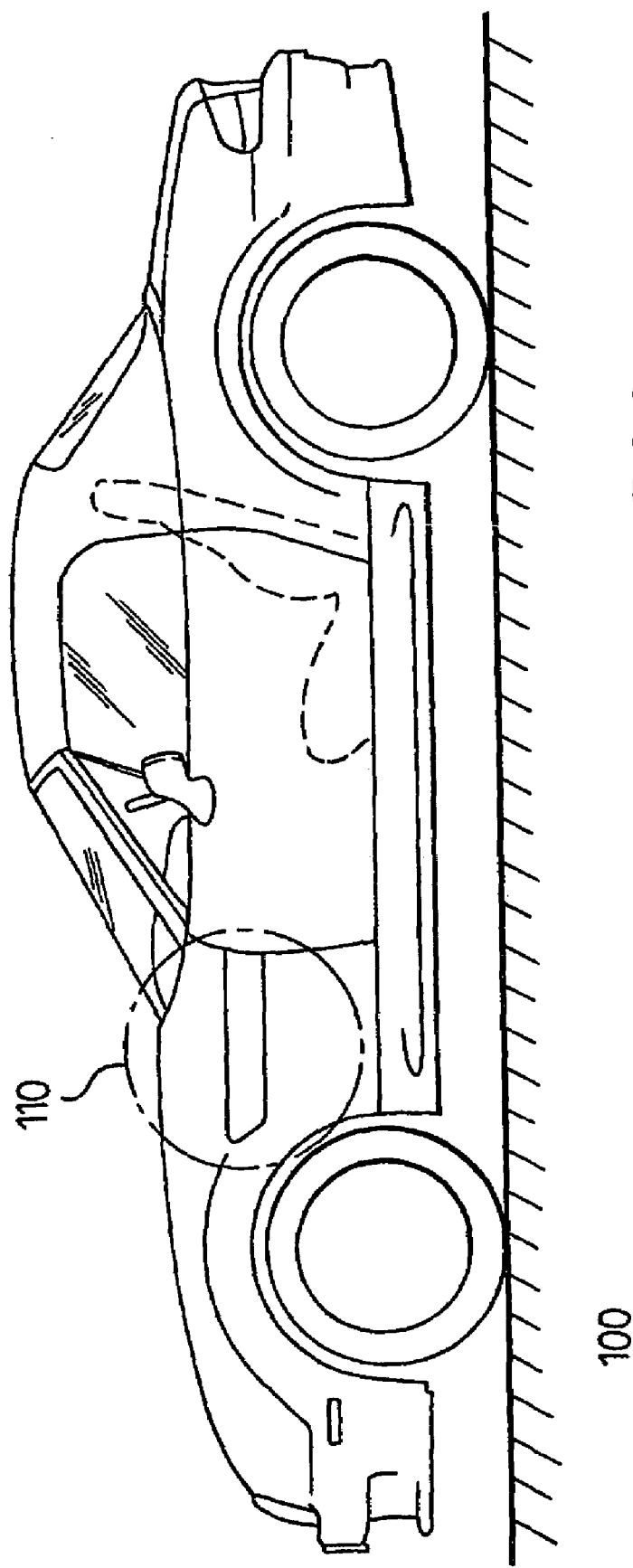

VEHICLE DOOR WITH PIVOT ARM

RELATED APPLICATIONS

This patent application is a § 371 of PCT/CA03/00890, filed on Jun. 6, 2003, which claims priority to and all the benefits of U.S. Provisional Patent Application No. 60/387,451, filed on Jun. 11, 2002.

FIELD OF THE INVENTION

This invention relates to a vehicle door, and more particularly, to a vehicle door pivot arm pivotally and slidably secured to a vehicle body.

BACKGROUND OF THE INVENTION

A conventional vehicle passenger door typically includes a pair of hinges attached between the door frame and the vehicle body. The door swings outwardly from the vehicle body, from a closed position to an open position. However, this arrangement has some disadvantages. For example, a passenger side door which is fitted with a hinge requires a relatively large open space beside the vehicle to enable the door to be opened without striking another vehicle or object. Consequently, attempts have been made to improve upon the conventional vehicle passenger door.

For instance, sliding doors have been developed for minivans as a means for providing improved access to the vehicle interior. Typically, the sliding vehicle door is mounted to the vehicle via a support mechanism which includes an upper track, a center track, and a lower track on which the sliding door is supported. Although such configurations are widely used, typical sliding door support mechanisms would not be suitable for use with a front door due to the lack of support for an upper track ahead of the windshield. Consequently, there remains a need for an improved vehicle passenger door which allows access to the vehicle interior without limitation from the proximity of the vehicle to adjacent vehicles.

SUMMARY OF THE INVENTION

According to one aspect of the present invention, there is provided a vehicle which includes a vehicle body, a vehicle door, and a pivot arm. The vehicle body has an interior, and a passenger door way which exposes the vehicle interior. The pivot arm has a first end pivotally coupled to the vehicle body, and a second end pivotally coupled to the vehicle door. The vehicle door slidably engages a track on the sill of the doorway. With this arrangement, the vehicle door moves between a closed position in which the door is disposed within the doorway and an open position in which the door exposes the interior, about a radius substantially less than the length of the door.

According to another aspect of the present invention, there is provided a vehicle door for fitting to a vehicle body. The vehicle body has a vehicle interior and a passenger doorway exposing the vehicle interior. The vehicle door includes a vehicle door frame, and a pivot arm coupled to the door frame. The door frame includes an upper portion, a lower portion, and a pair of opposite sides extending between the upper and lower portions. The pivot arm is coupled to the door frame adjacent one of the opposite sides, and includes a pair of opposite ends. One of the ends of the pivot arm includes a first hinge for pivotally coupling the pivot arm to the vehicle body about a first pivot axis. The other end includes a second hinge pivotally coupling the door frame to the pivot arm about a second pivot axis.

BRIEF DESCRIPTION OF THE DRAWINGS

The invention will now be described, by way of example only, with reference to the drawings, in which:

FIG. 4 is a side view of the vehicle, showing the vehicle door in the closed position;

FIG. 5 is an isometric view of the vehicle shown in FIG. 4, depicting the vehicle door in an intermediate position;

FIG. 6 is a top view of the vehicle shown in FIG. 4, depicting the vehicle door in an intermediate position, drawn at a larger scale;

FIG. 7 is a top view of the vehicle shown in FIG. 6, depicting the vehicle door in the open position; and FIG. 8 is a side view of a vehicle in which the pivot arm is positioned in a recessed section in the vehicle body.

BRIEF DESCRIPTION OF THE PREFERRED EMBODIMENT

Figure 1:
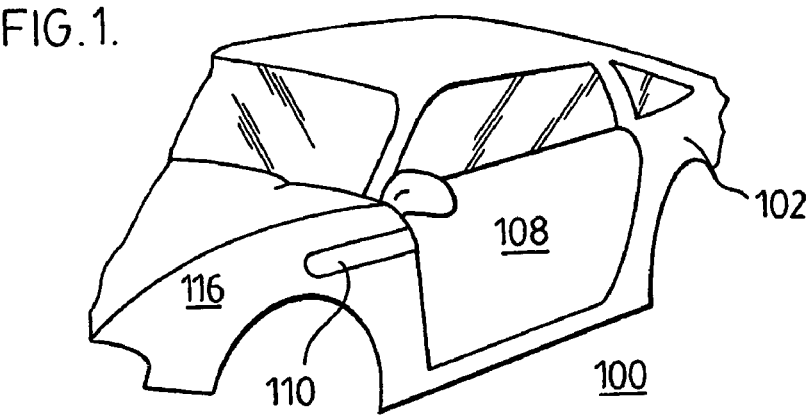
FIG. 1 is an isometric view of a vehicle showing the vehicle door in a closed position.

The drawings depict a vehicle, indicated generally by the numeral 100, which includes a vehicle body 102 having a vehicle interior 104, and a doorway 106 exposing the vehicle interior 104. The vehicle 100 also includes a vehicle door 108 and a pivot arm 110.

The vehicle door 108 is conventional in construction, and comprises an upper portion 142, a lower portion 144, and first and second ends 146, 148 extending between the upper portion 142 and the lower portion 144.

Figure 3:
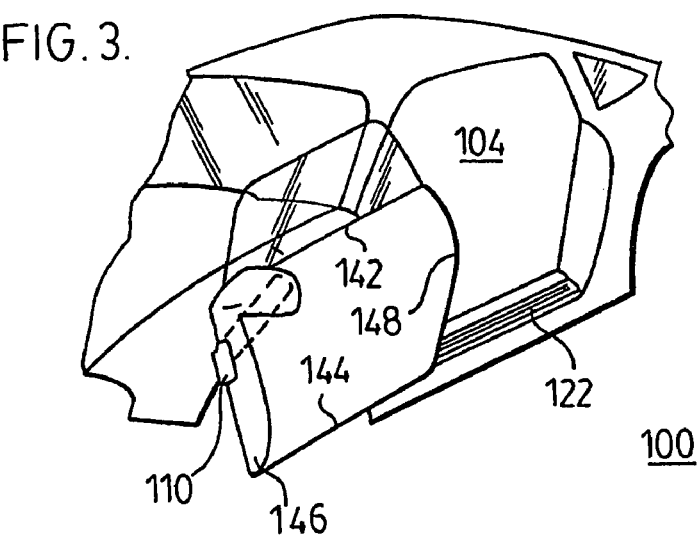
FIG. 3 is an isometric view of the vehicle shown in FIG. 1, depicting the vehicle door in a fully open position.

The pivot arm 110 supports the pivoting end of vehicle door 108, and facilitates movement of the vehicle door 108 between a door closed position (shown in FIG. 1) in which the vehicle door 108 is disposed in the doorway 106, and a door open position (shown in FIG. 3) in which the door 108 exposes the vehicle interior 104. Preferably, the pivot arm 110 is manufactured from steel, and comprises an elongate arm having opposite ends 112, 114. The first end 112 includes a first hinge 113 which pivotally couples the pivot arm 110 to the vehicle body 102 about a first pivot axis. The second end 114 includes a second hinge 115 pivotally coupled to the vehicle door 108 at the first end 146. Preferably, the hinges 113, 115 have a detent to thereby hold the vehicle door 108 in an opened position.

A latch 124 is shown mounted on one side of the vehicle door 108, and a striker 117 is shown mounted on the body 102. Alternately, in one variation, the latch 124 is mounted on the body 102, with the striker 117 being mounted on the vehicle door 108. In yet another variation, the latch 124 is mounted on one of the pivot arm 110 and the vehicle body 102, with the striker 117 being mounted on the other of the pivot arm 110 and the vehicle body 102. In each case, the latch 124 and the striker 117 cooperate to secure the vehicle door 108 in the door closed position.

The rearward end of the door 108 is provided with a latch 129. A striker 127 is mounted on the side 128 of the doorway 106. Also, typically the first pivot axis and the second pivot axis are vertical and are parallel to one another so as to minimize vertical movement of the vehicle door 108 as the vehicle door 108 moves between the open and closed positions. However, as will become apparent, the first and second pivot axes may have a different orientation so as to provide a different movement to the vehicle door 108.

Figure 2:
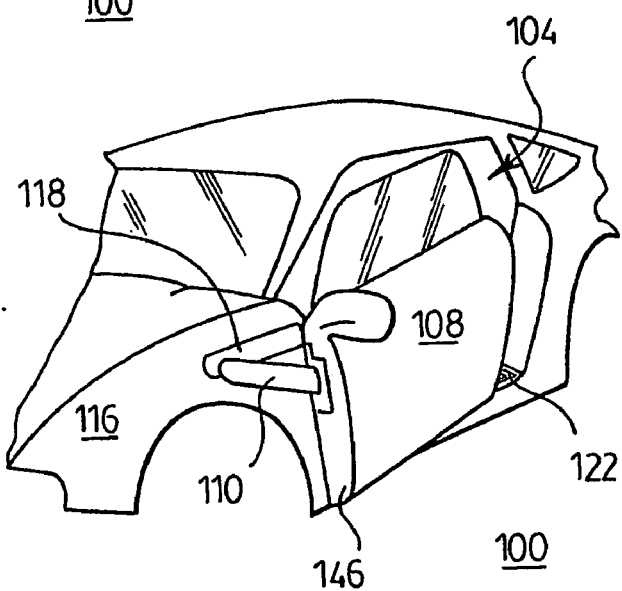
FIG. 2 is an isometric view of the vehicle shown in FIG. 1, depicting the vehicle door in an intermediate position in which the front part of the door is held outwardly from the vehicle by the pivot arm.

As shown in FIGS. 2, 4 and 8, the vehicle body 102 includes a body panel 116 disposed adjacent to and forward of the passenger doorway 106. Preferably, the body panel 116 includes a recessed section 118, with the first hinge 113 being secured to the vehicle body 102 at a fore position of the recessed section 118 (FIG. 2). The recessed section 118 is configured to receive the pivot arm 110 therein when the vehicle door 108 is disposed in the door closed position. Preferably, the pivot arm 110 and the recessed section 118 have a substantially horizontal orientation. However, the pivot arm 110 and the recessed section 118 may be inclined from horizontal if desired.

As shown in FIG. 5, the vehicle door 108 includes a release handle 120 operatively coupled to the pawl of the door latches 124, 129 in a manner well known in the art. The release handle 120 is moveable to release the door latches 124, 129 in a conventional manner.

As shown in FIGS. 6 and 7, preferably the sill of the doorway 106 includes a guide track 122 disposed adjacent a lower portion of the doorway 106. The vehicle door 108 includes a guide arm or pin 125 which extends from the rearward lower portion of the vehicle door 108 and is received within the guide track 122.

As shown in FIGS. 5 and 7, the doorway 106 also has first and second sides 126, 128, and the pivot arm 110 is disposed adjacent the first side 126. Preferably, the guide track 122 includes a substantially linear portion 130 extending longitudinally between the opposite sides 126, 128, and an arcuate end portion 132 which is disposed adjacent the rearward second side 128. With this arrangement, the door 108 follows the contour of the doorway 106 along a substantial portion thereof, and then moves inwardly towards the vehicle interior 104 as the door 108 approaches the closed position.

The vehicle door 108 operates as follows. Initially, the vehicle door 108 is in the closed position, closing the passenger doorway 106. The door latches 124, 129 retain the vehicle door 108 in the closed position. To open the vehicle door 108, the vehicle owner lifts the door handle 120, thereby releasing the latches 124, 129. The vehicle owner then applies force, via the door handle 120, in the forward direction and slightly outwards from the vehicle interior 104.

The applied force causes the pivot arm 110 to rotate about the first axis at the first hinge, and the vehicle door 108 to rotate relative to the pivot arm 110 at the second hinge 115. As a result, the forward end of the vehicle door 108 moves outwards slightly from the vehicle body 102. The second end 148 of the vehicle door 108 follows the contour of the guide track 122. Consequently, initially the second end 148 moves laterally outwards from the vehicle interior 106. As the applied force continues, the first end 146 of the vehicle door 108 continues to move outwards from the vehicle body 102 and towards the first side 126 of the doorway 106, and the second end 148 of the vehicle door 108 moves along the linear portion of the guide track 122, following the contour of the track 122.

The vehicle owner continues to apply force forwardly until the vehicle door 108 reaches the fully opened position, thereby exposing the vehicle interior 106. The door continues to travel until the detents of the hinges 113, 115 secure the vehicle door 108 in the open position. Additionally, a detent may be provided on the guide track 122 to hold the door in the open position.

To return the vehicle door 108 to the closed position, the vehicle operator urges the door 108 rearwardly overcoming the bias of the hinges 113, 115. The door 108 travels rearwardly until the latches 124, 129 engage the door in the closed position. As will be apparent, movement of the vehicle door 108 during the closing phase will opposite to that during the opening phase, as described above.

It will be evident to those skilled in the art that the invention can take many forms, and that such forms are within the scope of the invention as claimed. Therefore, the scope of the appended claims should not be limited to the description of the preferred versions contained herein.

We claim:

1. A vehicle door system comprising:
   a door for closing a passenger doorway in a vehicle body of a vehicle;
   a pivot arm having a first end pivotally connected to a first end of the door, and a second end pivotally connectable to the vehicle; and
   a guide mounted on a second end of the door for engagement with a guide track on the vehicle, the pivot arm and the guide cooperating to cause the door to pivot and slide relative to the vehicle as the door moves between an open and closed position;
   characterized in that the vehicle body includes a body panel disposed adjacent the passenger doorway which includes a substantially horizontal recessed section that is configured to receive the pivot arm therein and maintain the pivot arm flush with the body panel when the vehicle door is disposed in the closed position.

2. The vehicle door system according to claim 1, including a first hinge pivotally coupling the second end of the pivot arm to the vehicle body about a first pivot axis, and a second hinge pivotally coupling the first end of the pivot arm to the vehicle door about a second pivot axis, the first pivot axis comprising a substantially vertical axis and being substantially parallel to the second pivot axis.

3. The vehicle door system according to claim 2, wherein the first hinge is disposed proximate the recessed section.

4. The vehicle door system according to claim 2, wherein the passenger doorway includes said guide track disposed adjacent a lower portion thereof, and the vehicle door includes said guide received within the guide track for supporting the vehicle door.

5. The vehicle door system according to claim 4, wherein the passenger doorway has a pair of opposite sides, the pivot arm is disposed adjacent one of the opposite sides, and the guide track comprises a substantially linear guide track extending between the opposite sides, the linear guide track including an arcuate end disposed adjacent the other of the opposite sides and extending inwardly into the vehicle interior.

6. A vehicle door for fitting to a vehicle body, the vehicle body including a vehicle interior and a passenger doorway exposing the vehicle interior, the vehicle door comprising:
   a vehicle door frame including an upper portion, a lower portion and a pair of opposite sides extending between the upper and lower portions; and
   a pivot arm coupled to the door frame adjacent one of the opposite sides, the pivot arm including a pair of opposite ends, a first of the opposite ends including a first hinge for pivotally coupling the pivot arm to the vehicle body about a first pivot axis, the second end including a second hinge pivotally coupling the pivot arm to the vehicle door frame about a second pivot axis;

characterized in that the vehicle body includes a body panel disposed adjacent the passenger doorway which includes a substantially horizontal recess section that is configured to receive the pivot arm therein and maintain the pivot arm flush with the body panel when the vehicle door is disposed in the door closed position, and wherein the doorway includes a guide track, and the vehicle door includes a guide arm disposed adjacent the lower portion of the vehicle door frame for guiding the vehicle door along the guide track.

7. The vehicle door according to claim 6, wherein the first pivot axis is parallel to the second pivot axis.

* * * * *